Patented June 19, 1951

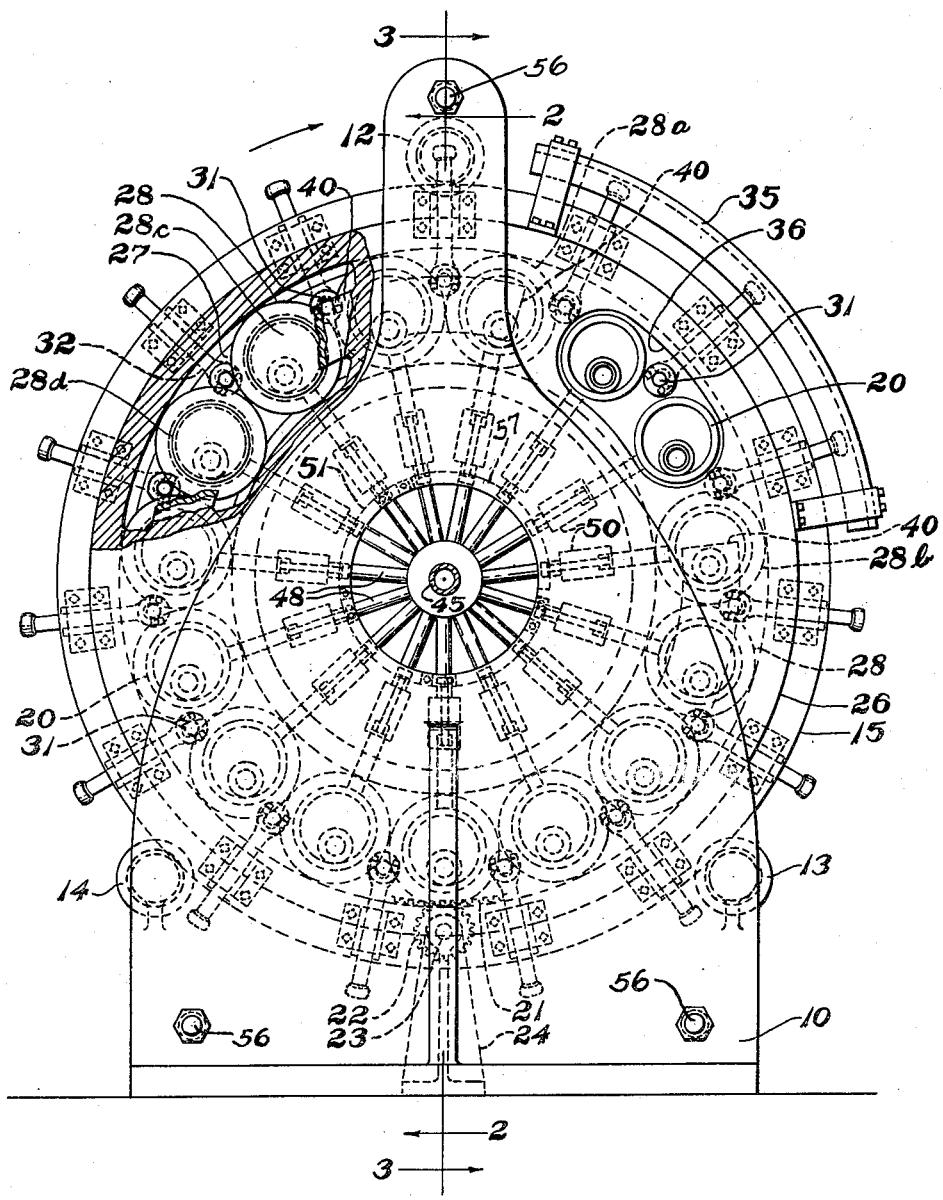

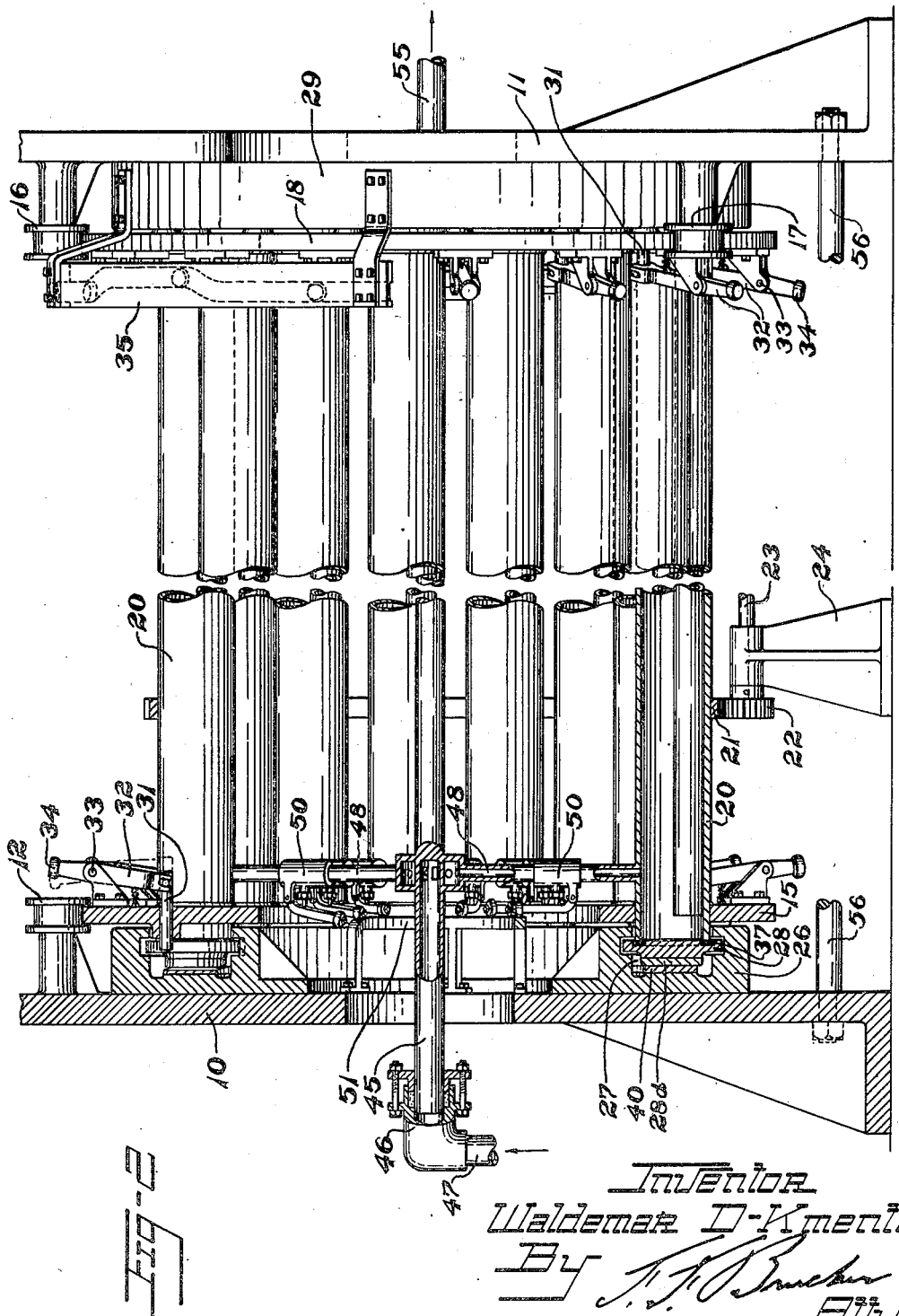

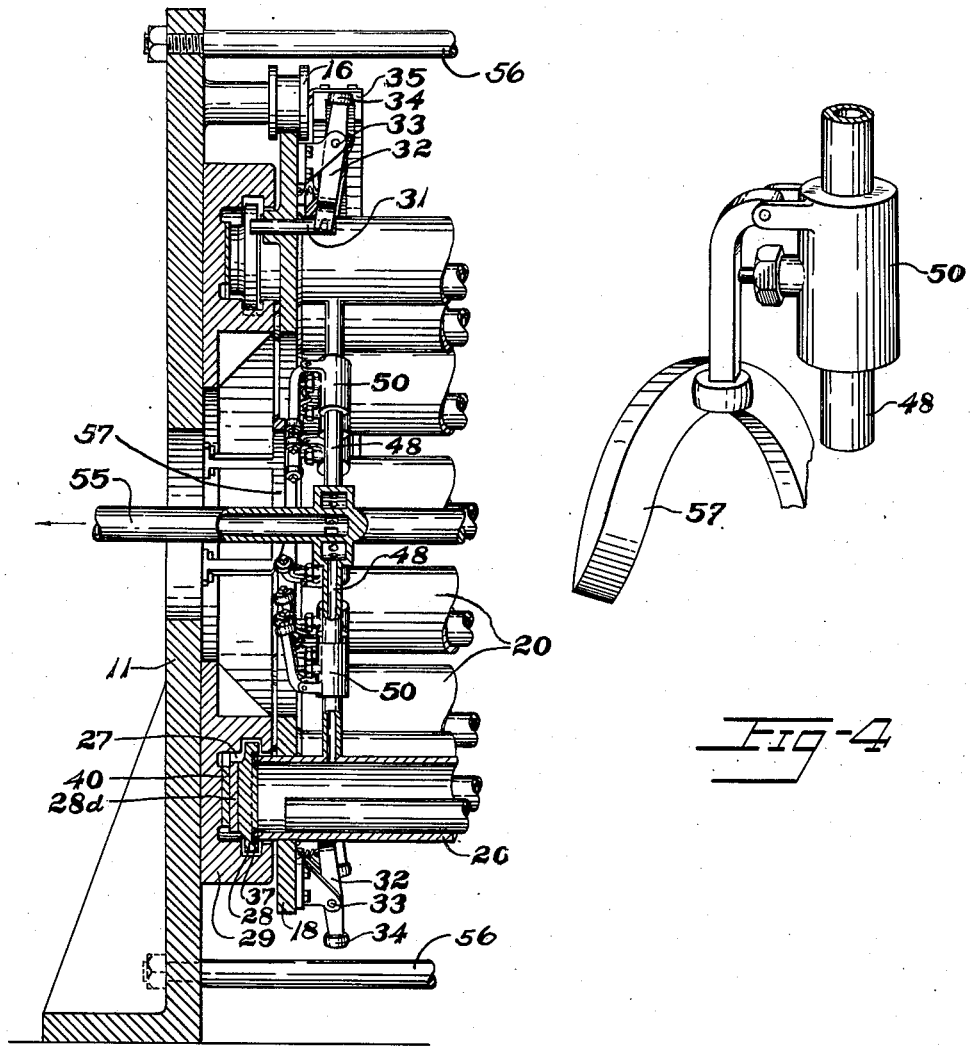

2,557,439

UNITED STATES PATENT OFFICE 2,557,439

CONTINUOUS HEATER

Waldemar D. Kmentt, Akron, Ohio, assignor to The B. F. Goodrich Company, New York, N. Y., a corporation of New York Application April 21, 1948, Serial No. 22,424

6 Claims. (Cl. 18—6)

This invention relates to the application of heat to elongate articles and is especially useful in the vulcanizing of lengths of hose or other elongate articles of rubber-like or other material.

In the manufacture of rubber hose on mandrels or poles, the hose material wrapped about a supporting pole or mandrel is vulcanized, preferably while pressed against the pole by a wrapping of cloth or a sheath of extruded lead, by steam under pressure applied to the surface of the article.

Where such articles have been enclosed as a group by placing them in autoclaves, pot heaters or open steam vulcanizers, difficulty has been experienced in obtaining uniform treatment of the articles due to uneven distribution of steam. Such group vulcanization has also required the use of vulcanizing trucks for handling the cured and uncured articles, with great consumption of floor space.

Furthermore, the large capacity of the vulcanizing chamber as compared to the volume of goods to be treated has resulted in great waste of steam.

It is an object of the present invention to provide for vulcanizing of a series of articles individually and simultaneously by successive loading and unloading of a series of successive treating chambers moving continuously.

Other objects are to provide uniformity of vulcanization, to provide automatic opening and closing of the vulcanizing chambers, to provide automatic control of the heating fluid, to provide continuous operation, and to provide economy of floor space.

These and other objects will appear from the following description and the accompanying drawings.

Of the drawings,

Fig. 1 is an end elevation of apparatus constructed in accordance with and embodying the invention.

Fig. 2 is a side elevation thereof partly taken in section along line 2—2 of Fig. 1, parts being broken away.

Fig. 3 is a detail sectional view taken on line 3—3 of Fig. 1, showing the opposite end of the apparatus.

Fig 4 is a detail perspective view of a valve and a cam for operating it.

Referring to the drawings, the numerals 10, 11 designate end frame members which are held in spaced-apart relation by a bed plate (not shown) and spacer rods 56. The end frame member 10 has grooved rollers 12, 13, 14 rotatably mounted thereon for rotatably supporting a flat ring member 15, and frame member 11 has similar grooved rollers 16, 17 for rotatably supporting a flat ring member 18 parallel to ring member 15. Secured at their opposite ends to ring members 15, 18 within openings therethrough so as to extend therebeyond are tubular chambers 20. A ring gear 21 is secured about all of the chambers for rotating the ring members 15, 18 and their connecting chambers about a horizontal axis. A pinion 22 is fixed to a shaft 23 rotatably mounted in a bracket 24. The shaft is driven from any suitable source of power (not shown), and its pinion 22 meshes with gear 21 to drive it.

Mounted on the end frame member 10 is an annular raceway 26, having a T-slot 27 extending therealong. Cover plates 28 for closing an end of a chamber are retained in the wide portion of the groove, there being less cover plates than chambers. The cover plates are free to roll or slide along the groove except as retained by means hereinafter described and have wear plates 28$^d$ secured thereto. A second raceway 29 of similar construction is mounted upon end frame member 11 and similar cover plates are mounted therein to close the opposite ends of the chambers.

For retaining the cover plates in the desired positions in alignment with the chambers, pins 31 are slidably mounted in axially extending openings through the rings 15, 18 and extend between adjacent cover plates. Each pin is pivotally connected to one end of a lever 32, pivotally secured, as at 33 to the ring member. The opposite end of the lever carries a roller 34 engageable with a cam 35 mounted on an end frame member. The arrangement is such that at a position beyond the vertical plane of the axis of rotation, the cam 35 withdraws the pins one at a time throughout an arc of rotation. An opening 36 in the end frame member within such arc permits loading and unloading of the chambers therethrough. The cover plates entering the arc of rotation such as the cover plate 28$^a$ are released in succession by withdrawal of the pins, and there being fewer cover plates than chambers, preferably two less, the cover plates roll past the opening under the force of gravitation and assume a position, such as at 28$^b$, opposite a chamber advanced beyond the opening and in contact wtih a preceding pin 31 which locates the cover plate opposite the chamber at that position. The pins 31 are returned by the cam 35 due to the shape of the cam as shown in Fig. 2.

Throughout the arc of rotation supplementary to that between cover plate 28$^a$ and 28$^b$, the cover plates are held against the chambers in sealed relation thereto and for this purpose a cam surface 40 is provided in the T-slot for slidably engaging the wear plates 28ᵈ of the cover plates and holding the cover plates against the ends of the chambers. Gasket means 37 is provided on each cover plate to seal the joint.

For heating the chambers, a steam manifold 45 extends along the axis of rotation of the apparatus and has a slip connection 46 to rotatably connect it to a steam supply line 47. Branch lines 48 connect the manifold to each chamber, and a normally closed throttle valve 50 in each line 48 controls flow therethrough. A stationary cam 51 is mounted on end frame member 10 throughout an arc starting at cover plate 28ᵇ and extending to 28ᶜ for holding the valves open throughout that arc of rotation, permitting them to close at 28ᶜ. At the opposite end of the apparatus, a similar arrangement of pipes and valves connects with an exhaust manifold 55 and a similar cam 57 opens the exhaust valves between positions 28ᶜ and 28ᵇ.

In the operation of the apparatus, the reel comprising the ring members 15, 18 and the tubular chambers 20 is rotated continuously at a speed corresponding to the desired curing cycle. As each chamber approaches opening 36 at which position the cam 40 ends its covers are released and drop by gravity to the position 28ᵇ, where cam 40 starts, permitting removal of a cured article and placing of an uncured article in the adjacent chamber. As the chamber progresses to position 28ᵇ, its covers roll into place, are pressed against the chamber ends by the cam 40, the following pin 31 is returned into place by cam 35 to prevent movement of the cover, and the valve 50 connected to the chamber is opened admitting steam to the chamber. At the same time, or shortly thereafter, the exhaust valve to the same chamber is closed. As the chamber reaches the position 28ᶜ, the steam valve is closed and the exhaust valve opened, permitting release of pressure in the chamber. As the chamber arrives at position 28ᵃ, its covers are released. As it reaches the opening 36 the cycle is complete.

As each article has its own vulcanizing chamber which closely surrounds it, waste of steam is reduced to a minimum and efficiency in heating is made possible. Also during rotation of the reel, the article is turned over within the chamber exposing all faces to the steam providing uniform cure.

Variations may be made without departing from the scope of the invention as it is defined by the following claims.

I claim:

1. Apparatus for applying heat to elongate articles, said apparatus comprising a frame, a support mounted thereon for rotation about an axis, said support having open-ended chambers extending parallel to its axis for enclosing individual articles, means for rotating said support, means for heating said chambers, individual covers for closing the ends of said chambers, annular guide means on said frame for confining said covers against movement radial of said support while permitting movement of said covers with said support during rotation of said support, and cam-controlled locating means for aligning said covers with the ends of said chambers during one arc of rotation of said support and permitting shifting of said covers away from said ends during another arc of rotation to permit loading and unloading of said chambers.

2. Apparatus for applying heat to elongate articles, said apparatus comprising a frame, a support mounted thereon for rotation about an axis, said support having open-ended chambers extending parallel to its axis for enclosing articles, means for rotating said support, means for heating said chambers, individual covers for closing the ends of said chambers, annular guide means on said frame for confining said covers against movement radial of said support while permitting movement of said covers with said support during rotation of said support, cam means on said guide means for pressing said covers against the ends of said chambers during an arc of rotation of said support, and cam-controlled dowel means for aligning said covers with said chambers throughout such arc of rotation and permitting circumferential shifting of said covers relative to said support to expose the ends of said chambers for loading and unloading during a supplementary arc of rotation of said support.

3. Apparatus for confining and heating articles, said apparatus comprising a frame, a support rotatable thereon about an axis, open ended heating chambers spaced circumferentially about said support and parallel to its axis, said chambers each having an open end, closure members independent of said support, a guideway on said frame at one end of said chambers for confining said closure members for independent movement in a course about said axis adjacent the ends of said chambers, cam-controlled locking means for holding said closure members opposite the ends of said chambers throughout a portion of said course, cam means for engaging said closure members with the open ends of said chambers throughout said portion of the course, said cam means and said locking means permitting independent movement of said closure members along another portion of the course to uncover said chambers for loading and unloading operations, and means for heating said chambers.

4. Apparatus for applying heat to elongate articles, said apparatus comprising a plurality of tubular chambers movable about a determinate course, said chambers being adapted to receive articles to be heated, removeable covers at the ends of the chambers for closing said chambers, means for advancing said chambers along said course in succession, means for heating said chambers as they are so advanced, means along said course independent of said chambers for guiding said covers along said course, stationary cam means along said course, and means movable with said chambers and operable by contact with said cam means for aligning said covers in covering relation to the ends of said chambers throughout a portion of said course and releasing them for uncovering said chambers throughout another portion of said course.

5. Apparatus for applying heat to elongate articles, said apparatus comprising a plurality of tubular chambers, means supporting said chambers for rotation about an axis parallel to the axes of said chambers, said chambers being adapted to receive articles to be heated, removable covers at the ends of the chambers for closing said chambers, means for advancing said chambers about said supporting means in succession, means for heating said chambers as they are advanced, means along the course of advance of said chambers independent of said chambers for guiding said covers along said course, stationary cam means along said course, and means movable with said chambers and operable by contact with said stationary cam means along said course for aligning said covers in covering relation to the ends of said chambers throughout a portion of said course and releasing them for uncovering said chambers throughout another portion of said course.

6. Apparatus for applying heat to elongate articles, said apparatus comprising a plurality of elongate open-ended chambers for enclosing the articles, means for heating said chambers, removeable covers for the ends of said chambers, said covers being gravitationally positionable in covering and uncovering relation to said chambers, means for moving said chambers along a determinate course, stationary means along said course for engaging and guiding said covers, and stop means carried with the chambers and cooperating with said stationary means for aligning said covers against gravitational movement to open and close said chambers as they pass along a portion of said course.

WALDEMAR D. KMENTT.

REFERENCES CITED

The following references are of record in the file of this patent:

UNITED STATES PATENTS

| Number | Name | Date |
| --- | --- | --- |
| 77,952 | Beins | May 19, 1868 |
| 1,548,537 | MacDonald | Aug. 4, 1925 |
| 1,647,040 | Fritz | Oct. 25, 1927 |
| 2,027,165 | Grubman | Jan. 7, 1936 |